United States Patent
Yamato et al.

(10) Patent No.: US 6,264,739 B1
(45) Date of Patent: Jul. 24, 2001

(54) DISPERSANT FOR PLASTER

(75) Inventors: Fujio Yamato; Kazushige Kitagawa; Yoshinao Kohno, all of Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 08/917,495

(22) Filed: Aug. 26, 1997

(51) Int. Cl.$^7$ ................................................. C04B 24/12
(52) U.S. Cl. ..................... 106/778; 106/785; 106/820; 106/823
(58) Field of Search .................... 106/772, 778, 106/785, 820, 823

(56) References Cited

U.S. PATENT DOCUMENTS

| | | | | |
|---|---|---|---|---|
| 5,332,523 | * | 7/1994 | Igarashi et al. | 252/309 |
| 5,362,323 | * | 11/1994 | Koyata et al. | 106/810 |
| 5,393,343 | * | 2/1995 | Darwin et al. | 106/808 |
| 5,618,344 | * | 4/1997 | Kerkar et al. | 106/823 |
| 5,643,978 | * | 7/1997 | Darwin et al. | 524/5 |
| 5,665,158 | * | 9/1997 | Darwin et al. | 106/808 |
| 5,725,657 | * | 3/1998 | Darwin et al. | 106/808 |
| 5,888,322 | * | 3/1999 | Holland | 106/785 |

FOREIGN PATENT DOCUMENTS

| | | | |
|---|---|---|---|
| 59-203742 | | 11/1984 | (JP) . |
| 08217505 | * | 8/1996 | (JP) . |
| 08217507 | * | 8/1996 | (JP) . |

* cited by examiner

*Primary Examiner*—Paul Marcantoni
(74) *Attorney, Agent, or Firm*—Birch, Stewart, Kolasch and Birch, LLP

(57) ABSTRACT

An dispersant for plaster comprising a copolymer prepared by copolymerizing (a) a polyalkylene glycol monoester monomer having 2 to 300 mols of an oxyalkylene group(s) each having 2 to 3 carbon atoms, with (b) at least one monomer selected from among acrylic monomers, unsaturated dicarboxylic monomers and allylsulfonic monomers. When the dispersant of the present invention is used in preparing a plaster board, the foam stability is maintained so that the quality of the plaster board composition can be easily controlled.

3 Claims, No Drawings

DISPERSANT FOR PLASTER

BACKGROUND OF INVENTION

1. Field of the Invention

The present invention relates to a dispersant for plaster. In particular, the present invention relates to a dispersant for plaster which can impart proper dispersion to a plaster composition, and has an excellent effect on the foam stability of the composition.

2. Description of the Related Art

Among various dispersants for plaster, such as salts of condensates of naphthalenesulfonic acid with formaldehyde (hereinafter referred to as "the naphthalene compounds"), salts of condensates of melaminesulfonic acid with formaldehyde (hereinafter referred to as "the melamine compounds"), and salts of polycarboxylic acids (hereinafter referred to as "the polycarboxylic acid compounds"). By using these naphthalene compounds, water during mixing step can be reduced and drying time shortened.

In making plaster boards, at first, plaster powder, a dispersant-water mixture, a hardening improver or the like and very fine foam are continuously introduced into a mixer. The mixture is discharged after agitation for about 10 seconds, and is sandwiched by paper boards. But, even if enough foam is introduced, some of the foam breaks which creates undesirable spaces or voids in the plaster board. So, generally twice the amount of foam is introduced. Furthermore, the broken foam concentrates on the faces of the boards which prohibits bonding.

DISCLOSURE OF THE INVENTION

SUMMARY OF THE INVENTION

The present inventors have made extensive studies on the cause of the above problem and have solved it. As a result of studies, they have found that foam breaking is caused by dispersants. By using the dispersant of the present invention, the problem is solved. Thus, the inventors have found that the usual naphthalene compounds have strong power for destroying foam.

Thus, the present invention relates to an dispersant for plaster comprising a copolymer prepared by copolymerizing a monomer (a) represented by the following formula (A) with a monomer (b) selected from the group consisting of the compounds represented by the following formula (B) and those represented by the following formula (C), or mixtures of (B) and (C):

(A)

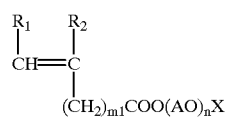

wherein $R_1$ and $R_2$ may be the same or different from each other and each represents a hydrogen atom or a methyl group; m1 is an integer of 0 to 2; AO represents an oxyalkylene group having 2 to 3 carbon atoms; n is a number of 2 to 300; and X represents a hydrogen atom or an alkyl group having 1 to 3 carbon atoms, (B)

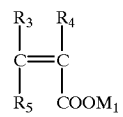

wherein $R_3$, $R_4$ and $R_5$ may be the same or different from one another and each represents a hydrogen atom, a methyl group or a group represented by the formula: $(CH_2)_{m2}COOM_2$ (wherein m2 is an integer of 0 to 2; and M2 represents a hydrogen atom, an alkali metal atom, ½ an alkaline earth metal atom, an ammonium group, an alkylammonium group or a substituted alkylammonium group); and M1 represents a hydrogen atom, an alkali metal atom, ½ an alkaline earth metal atom, an ammonium group, an alkylammonium group or a substituted alkylammonium group, and (C)

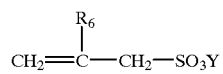

wherein $R_6$ represents a hydrogen atom or a methyl group; and Y represents a hydrogen atom, an alkali metal atom, ½ an alkaline earth metal atom, an ammonium group, an alkylammonium group or a substituted alkylammonium group.

Preferably the dispersant copolymer is a copolymer prepared by copolymerizing monomer (A) with a mixture of monomers (B) and (C), and more preferably a copolymer of monomer (A) and (B).

In formula (A), n refers to not only the number of alkylene oxide molecules added of one compound represented by the formula (A), but also the average number of alkylene oxide molecules added of a mixture of compounds represented by the formula (A) which are different from one another only in the number of alkylene oxide molecules added. In the former case, n is an integer of 2 to 300, while in the latter, n is an integer of 2 to 300, preferably an integer of 110 to 300. In the latter, the above-mentioned mixture has a distribution with respect to the number of alkylene oxide molecules added. The mixture having an average number of alkylene oxide molecules added of 2 to 300 may contain also a compound having a number of alkylene oxide molecules added of less than 2 and/or a compound having a number of alkylene oxide molecules added of more than 300.

The present invention includes a dispersant for plaster comprising, as an essential component, a copolymer prepared by copolymerizing a monomer (a) represented by the following general formula (A) with at least one monomer (b) selected from among the compounds represented by the following general formula (B) and those represented by the following general formula (C):

general formula (A)

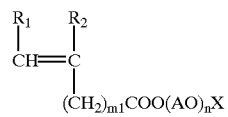

(wherein, $R_1$ and $R_2$: hydrogen or a methyl group,
m1: an integer of 0 to 2,
AO: an oxyalkylene group having 2 to 3 carbon atoms,
n: an integer of 2 to 300,
X: hydrogen or an alkyl group having 1 to 3 carbon atoms),
general formula (B) general formula (C)

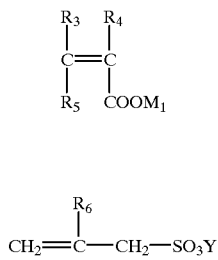

(wherein, $R_3$–$R_5$: hydrogen, a methyl group or $(CH_2)_{m2}COOM_2$
R6: hydrogen or a methyl group,
$M_1$, $M_2$ and Y: hydrogen, alkali metal,
alkaline earth metal,
ammonium, alkylammonium or
substituted alkylammonium,
$m_2$: an integer of 0 to 2).

Further, the present invention relates to a method for improving the quality of a plaster board which comprises adding a copolymer prepared by copolymerizing a monomer (a) represented by the above formula (A) with a monomer (b) selected from the group consisting of the compounds represented by the above formula (B) and those represented by the above formula (C) to a plaster composition, and use of a copolymer prepared by copolymerizing a monomer (a) represented by the above formula (A) with a monomer (b) selected from the group consisting of the compounds represented by the above formula (B) and those represented by the above formula (C) for improving the fluidity of a plaster composition.

Furthermore, the present invention relates to a plaster composition comprising a copolymer prepared by copolymerizing a monomer (a) represented by the above formula (A) with a monomer (b) selected from the group consisting of the compounds represented by the above formula (B) and those represented by the above formula (C), surfactant and water.

The dispersant according to the present invention has oxyalkylene chains, which imparts strong protection against calcium ions which dissolve out from the slurry. The dispersant is also an adduct of 2 or more oxyalkylene groups so it stablizes the foam. Thus, a copolymer of poly(meth) acrylic acid without oxyalkylene groups or a poly(meth) acrylic acid adduct containing only one mole of oxyalkylene and a hydroxy ethylmethacrylate does not maintain good foam stability. Furthermore, an inventive dispersant containing 100–300 mole oxyalkylene groups are excellent foam stabilizers.

DETAILED DESCRIPTION OF THE INVENTION

Examples of the monomer (a) represented by the formula (A) to be used in the present invention includes esters of polyalkylene glycols having one end etherified with alkyl [for example, methoxypolyethylene glycol, i.e., an adduct of methanol with ethylene oxide (n is-from 2 to 300), methoxypolyethylenepolypropylene glycol, ethoxy polyethylene glycol, ethoxypolyethylenepolypropylene glycol, propoxypolyethylene glycol and propoxypolyethylenepolypropylene glycol] with acrylic acid, methacrylic acid and products of dehydrogenation (or oxidation) of fatty acids; and adducts of acrylic acid, methacrylic acid and products of dehydrogenation (or oxidation) of fatty acids with ethylene oxide and/or propylene oxide.

The number of the oxyalkylene groups constituting the oxyalkylene chain of the above polyalkylene glycol, or the (average) number of alkylene oxide molecules added of the above adduct is from 2 to 300. When both ethylene oxide and propylene oxide are added, they may be added in any manner such as random addition, block addition, alternating additions of random and block and others. When the number of the oxyalkylene groups constituting the oxyalkylene chain of the polyalkylene glycol or the (average) number of alkylene oxide molecules added of the adduct is less than 2 or exceeds 300, the resulting copolymer will exhibit a poor dispersing effect.

The compound represented by the formula (B) includes unsaturated monocarboxylic acid monomers and unsaturated polycarboxylic acid monomers. Examples of the unsaturated monocarboxylic acid monomers include acrylic acid, methacrylic acid and crotonic acid, and their alkali metal salts, alkaline earth metal salts, ammonium salts, alkylamine salts and substituted alkylamine salts. Among them, acrylic acid, methacrylic acid and crotonic acid, and alkali metal salts thereof are preferable. While, examples of the unsaturated dicarboxylic acid monomers include maleic anhydride, maleic acid, itaconic anhydride, itaconic acid, citraconic anhydride, citraconic acid and fumaric acid, and their alkali metal salts, alkaline earth metal salts, ammonium salts, alkylamine salts and substituted alkylamine salts. The alkyl group of the alkylamine salt is preferably one having 1 to 3 carbon atoms. Examples of the substituted alkylamine include monoethanolamine, diethanolamine and triethanolamine.

Examples of the compound represented by the formula (C) include allylsulfonic acid and methallylsulfonic acid, and their alkali metal salts, alkaline earth metal salts, ammonium salts, alkylamine salts and substituted alkylamine salts. The number of carbon atoms of the alkyl group of the alkylamine salt and examples of the substituted alkyl group of the substituted alkylamine are the same as those described above with respect to the compound represented by the formula (B).

In the present invention, it is suitable that the starting monomers (a) and (b) are each used in such an amount that a molar ratio of the monomer (a) to the monomer (b), i.e., monomer (a)/monomer (b), ranges from 0.1/100 to 200/100. When the molar ratio ranges from 0.1/100 to 100/100, particularly when it is 1/100 or above but less than 33/100, the resulting copolymer exhibits excellent stability of the dispersing effect, while the fluidizing effect of the plaster compositions is retained. When the molar ratio is less than 0.1/100 or 200/100, the resulting copolymer will exhibits a poor dispersing effect.

The copolymer according to the present invention can be prepared by known processes. Examples thereof include solvent polymerization disclosed in Japanese Patent Publication-A Nos. 59-162163 (published on Sep. 13, 1984, 62-70250 (published on Mar. 31, 1987) and 62-78137 (published on Apr. 10, 1987), U.S. Pat. Nos. 4,870,120 (date of patent: Sep. 26, 1989, assignee: Nippon Shokubai Kagaku Kogyo Co., Ltd.) and 5,137,945 (date of patent: Aug. 11, 1992, assignee: Nippon Shokubai Kagaku Kogyo Co. Ltd.) and others.

Examples of the solvent to be used in the above solvent polymerization include water, methanol, ethanol, isopropanol, benzene, toluene, xylene, aliphatic hydrocarbons such as cyclohexane and n-hexane, ethyl acetate, acetone and methyl ethyl ketone. Water and $C_1$–$C_4$ mono- to tetra-hydric alcohols are preferable from the standpoint of workability and reaction equipment.

In the solvent polymerization using an aqueous solvent, a water-soluble polymerization initiator such as ammonium salts and alkali metal salts of persulfuric acids (i.e., peroxysulfuric acid and peroxydisulfuric acid), and hydrogen peroxide is used as the polymerization initiator. In the solvent polymerization using a solvent other than the aqueous ones, benzoyl peroxide, lauroyl peroxide or the like is used as the polymerization initiator.

Further, a polymerization accelerator such as sodium hydrogensulfite, mercaptoethanol and an amine compound may be used together with the polymerization initiator. According to the present invention, the polymerization initiator and polymerization accelerator to be used are suitably selected.

It is preferable that the copolymer of the present invention have a weight-average molecular weight of 1,000 to 500,000, still more preferably 5,000 to 100,000. When the molecular weight is too large, the resulting copolymer will exhibit a poor dispersing effect. When it is too small, the resulting copolymer will exhibit a poor dispersing effect. The weight-average molecular weight is determined by gel permeation chromatography using sodium polystyrenesulfonate as a standard reference material.

In the preparation of the copolymer according to the present invention, in addition of monomers (a) and (b), other monomer(s), which is copolymerizable with the monomers (a) and (b), may be used so far as the effects of the present invention are not impaired. Examples of such monomers include acrylonitrile, acrylic acid ester, acrylamide, methacrylamide, styrene and styrenesulfonic acid.

A plaster composition of the present invention comprises a mixture of the dispersant for plaster of the present invention with a plaster powder. Surfactants used in making plaster compositions are also incorporated. The types of surfactants and amounts are well known to those skilled in the art.

The dispersant of the present invention is present in a plaster composition preferably in an amount of 0.01 to 1.0% by weight, still more preferably 0.05 to 0.2% by weight, based on the weight of the plaster powder.

EXAMPLES

The present invention will now be described in more detail by referring to the following Examples, though the scope of the present invention is not limited by them.

In the following Examples, all percentages are given by weight.

The molecular weights of the condensates and copolymers described in the Examples are each a weight-average molecular weight which is determined by gel permeation chromatography using sodium polystyrenesulfonate as a standard reference material.

The monomers (a) used in the preparation of copolymers according to the present invention will now be described, wherein EO represents ethylene oxide and PO propylene oxide.

A-1: monomethacrylate of adduct of methanol with EO (average number of EO molecules added: 3)

A-2: monoacrylate of adduct of methanol with EO (average number of EO molecules added: 23)

A-3: monomethacrylate of adduct of methanol with EO (average number of EO molecules added: 90)

A-4: monomethacrylate of adduct of methanol with EO (average number of EO molecules added: 120)

A-5: adduct of acrylic acid with EO (average number of EO molecules added: 130)

A-6: block adduct of acrylic acid with EO and PO (average number of Eo molecules added: 135, average number of PO molecules added: 5)

A-7: monomethacrylate of adduct of methanol with EO (average number of EO molecules added: 150)

A-8: monomethacrylate of adduct of methanol with EO (average number of EO molecules added: 280)

A-9: monomethacrylate of adduct of methanol with EO (average number of EO molecules added: 350)

COMPARATIVE EXAMPLE

Preparative Examples of the copolymers will now be described.

Preparative Example 1 (preparation of dispersant 1 for Plaster)

3 mol of water was fed into a reactor fitted with a stirrer. Oxygen in the reactor was purged with nitrogen while stirring the water. The temperature of the water was raised to 75° C. in a nitrogen atmosphere. A solution prepared by dissolving 1.5 mol of monomer A-1 and 1 mol of acrylic acid (molar ratio: 150/100) in 5 mol of water, a 20% aqueous solution prepared by dissolving 0.03 mol of ammonium persulfate in water, and 3 g of 2-mercaptoethanol were dropwise added to the water in the reactor simultaneously and separately in 2 hours. Then, a 20% aqueous-solution prepared by dissolving 0.03 mol of ammonium persulfate in water was dropwise added to the reaction system in 30 minutes. After the completion of the dropwise addition, the reaction system was maintained at that temperature (75° C.) for one hour. That is, aging was effected. After the completion of the aging, the temperature of the reaction system was raised to 95° C. Then, 9 g of a 35% aqueous hydrogen peroxide was dropwise added to the reaction system in one hour. After the completion of the dropwise addition, the temperature of the reaction system was maintained at that temperature (95° C.) for 2 hours. That is, aging was effected. After the completion of the aging, a 48% aqueous solution prepared by dissolving 0.7 mol of sodium hydroxide in water was added to the obtained reaction mixture to conduct neutralization. Thus, a copolymer having a molecular weight of 31,000, i.e., dispersant 1 for plaster, was obtained.

Preparative Example 2 (preparation of dispersant 2 for plaster)

5 mol of water was fed into a reactor fitted with a stirrer. Air in the reactor was purged with nitrogen while stirring the water. The temperature of the water was raised to 75° C. in a nitrogen atmosphere. A solution prepared by dissolving 0.5 mol of monomer A-2 and 1 mol of methacrylic acid (molar ratio: 50/100) in 6 mol of water, a 20% aqueous solution prepared by dissolving 0.01 mol of ammonium persulfate in water, and 3 g of 2-mercaptoethanol were dropwise added to the water in the reactor simultaneously and separately in 2 hours. Then, a 20% aqueous solution prepared by dissolving 0.03 mol of ammonium persulfate in water was dropwise added to the reaction system in 30 minutes. After the completion of the dropwise addition, the reaction system was maintained at that temperature (75° C.) for one hour. That is, aging was effected. After the completion of the aging, the temperature of the reaction system was raised to 95° C. Then, 9 g of a 35% aqueous hydrogen peroxide was dropwise added to the reaction system in one hour. After the completion of the dropwise addition, the reaction system was maintained at that temperature (95° C.) for 2 hours. That is, aging was effected. After the completion of the aging, a 48% aqueous solution prepared by dissolving 0.7 mol of sodium hydroxide in water was added to the obtained reaction mixture to conduct neutralization. Thus, a copolymer having a molecular weight of 41,000, i.e., dispersant 2 for plaster, was obtained.

Preparative Example 3 (preparation of dispersant 3 for plaster)

7 mol of water was fed into a reactor fitted with a stirrer. Oxygen in the reactor was purged with nitrogen while stirring the water. The temperature of the water was raised to 95° C. in a nitrogen atmosphere. A solution prepared by dissolving 0.2 mol of monomer A-3 and 1 mol of monosodium maleate (molar ratio: 20/100) in 8 mol of hot water at 90° C., a 20% aqueous solution prepared by dissolving 0.01 mol of ammonium persulfate in water, and 3 g of 2-mercaptoethanol were dropwise added to the water in the reactor simultaneously and separately in 2 hours. Then, a 20% aqueous solution prepared by dissolving 0.03 mol of ammonium persulfate in water was dropwise added to the reaction system in 30 minutes. After the completion of the dropwise addition, the reaction system was maintained at that temperature (95° C.) for one hour. That is, aging was effected. After the completion of the aging, 9 g of a 35% aqueous hydrogen peroxide was dropwise added to the reaction system at that temperature (95° C.) in one hour. After the completion of the dropwise addition, the reaction system was maintained at that temperature (95° C.) for 2 hours. That is, aging was effected. After the completion of the aging, a 48% aqueous solution prepared by dissolving 0.7 mol of sodium hydroxide in water was added to the obtained reaction mixture to conduct neutralization. Thus, a copolymer having a molecular weight of 37,000, i.e., dispersant 3 for plaster, was obtained.

Preparative Example 4 (preparation of dispersant 4 for plaster)

5 mol of water was fed into a reactor fitted with a stirrer. oxygen in the reactor was purged with nitrogen while stirring the water. The temperature of the water was raised to 95° C. in a nitrogen atmosphere. A solution prepared by dissolving 0.2 mol of monomer A-4 and 1 mol of methacrylic acid (molar ratio: 20/100) in 8 mol of hot water at 90° C., a 20% aqueous solution prepared by dissolving 0.01 mol of ammonium persulfate in water, and 3 g of 2-mercaptoethanol were dropwise added to the water in the reactor simultaneously and separately in 2 hours. Then, a 20% aqueous solution prepared by dissolving 0.03 mol of ammonium persulfate in water was dropwise added to the reaction system in 30 minutes. After the completion of the dropwise addition, the reaction system was maintained at that temperature (95° C.) for one hour. That is, aging was effected. After the completion of the aging, 9 g of a 35% aqueous hydrogen peroxide was dropwise added to the reaction system at that temperature (95° C.) in one hour. After the completion of the dropwise addition, the reaction system was maintained at that temperature (95° C.) for 2 hours. That is, aging was effected. After the completion of the aging, a 48% aqueous solution prepared by dissolving 0.7 mol of sodium hydroxide in water was added to the obtained reaction mixture to conduct neutralization. Thus, a copolymer having a molecular weight of 37,000, i.e., dispersant 4 for plaster, was obtained.

Preparative Example 5 (preparation of dispersant 5 for plaster)

10 mol of water was fed into a reactor fitted with a stirrer. Oxygen in the reactor was purged with nitrogen while stirring the water. The temperature of the water was raised to 75° C. in a nitrogen atmosphere. A solution prepared by dissolving 0.01 mol of monomer A-4, 0.9 mol of acrylic acid and 0.1 mol of sodium methallylsulfonate (molar ratio: 1/90/10) in 7.5 mol of water, a 20% aqueous solution prepared by dissolving 0.01 mol of ammonium persulfate in water, and 4 g of 2-mercaptoethanol were dropwise added to the water in the reactor simultaneously and separately in 2 hours. Then, a 20% aqueous solution prepared by dissolving 0.03 mol of ammonium persulfate in water was dropwise added to the reaction system in 30 minutes. After the completion of the dropwise addition, the reaction system was maintained at that temperature (75° C.) for one hour. That is, aging was effected. After the completion of the aging, the temperature of the reaction system was raised to 95° C. Then, 12 g of a 35% aqueous hydrogen peroxide was dropwise added to the reaction system in one hour. After the completion of the dropwise addition, the reaction system was maintained at that temperature (95° C.) for 2 hours. That is, aging was effected. After the completion of the aging, a 48% aqueous solution prepared by dissolving 0.6 mol of sodium hydroxide in water was added to the obtained reaction mixture to conduct neutralization. Thus, a copolymer having a molecular weight of 7,200, i.e., dispersant 5 for plaster, was obtained.

Preparative Example 6 (preparation of dispersant 6 for plaster)

10 mol of water was fed into a reactor fitted with a stirrer. Air in the reactor was purged with nitrogen while stirring the water. The temperature of the water was raised to 75° C. in a nitrogen atmosphere. A solution prepared by dissolving 0.01 mol of monomer A-6 and 1 mol of sodium acrylate (molar ratio: 1/100) in 7.5 mol of water, a 20% aqueous solution prepared by dissolving 0.01 mol of ammonium persulfate in water, and 2 g of 2-mercaptoethanol were dropwise added to the water in the reactor simultaneously and separately in 2 hours. Then, a 20% aqueous solution prepared by dissolving 0.03 mol of ammonium persulfate in water was dropwise added to the reaction system in 30 minutes. After the completion of the dropwise addition, the reaction system was maintained at that temperature (75° C.) for one hour. That is, aging was effected. After the completion of the aging, the temperature of the reaction system was raised to 95° C. Then, 9 g of a 35% aqueous hydrogen peroxide was dropwise added to the reaction system in one hour. After the completion of the dropwise addition, the reaction system was maintained at that temperature (95° C.) for 2 hours. That is, aging was effected. After the completion of the aging, a 48% aqueous solution prepared by dissolving 0.7 mol of sodium hydroxide in water was added to the obtained reaction mixture to conduct neutralization. Thus, a copolymer having a molecular weight of 77,000, i.e., dispersant 6 for plaster, was obtained.

Preparative Example 7 (preparation of dispersant 7 for plaster)

10 mol of water was fed into a reactor fitted with a stirrer. Air in the reactor was purged with nitrogen while stirring the water. The temperature of the water was raised to 75° C. in a nitrogen atmosphere. A solution prepared by dissolving 0.15 mat of monomer A-2 and 1.0 mol of acrylic acid (molar ratio: 15/100) in 8 mol of water, a 20% aqueous solution prepared by dissolving 0.003 mol of ammonium persulfate in water, and 1.2 g of 2-mercaptoethanol were dropwise added to the water in the reactor simultaneously and separately in 2 hours. Then, a 20% aqueous solution prepared by dissolving 0.009 mol of ammonium persulfate in water was dropwise added to the reaction system in 30 minutes. After the completion of the dropwise addition, the reaction system was maintained at that temperature (75° C.) for one hour. That is, aging was effected. After the completion of the aging, the temperature of the reaction system was raised to 95° C. Then, 4 g of a 35% aqueous hydrogen peroxide was dropwise added to the reaction system in one hour. After the completion of the dropwise addition, the reaction system was maintained at that temperature (95° C.) for 2 hours. That is, aging was effected. After the completion of the aging, a 48% aqueous solution prepared by dissolving 0.21 mol of sodium hydroxide in water was added to the obtained reaction mixture to conduct neutralization. Thus, a copolymer having a molecular weight of 67,000, i.e., dispersant 7 for plaster, was obtained.

Preparative Example 8 (preparation of dispersant 8 for plaster)

5 mol of water was fed into a reactor fitted with a stirrer. Oxygen in the reactor was purged with nitrogen while stirring the water. The temperature of the water was raised to 75° C. in a nitrogen atmosphere. A solution prepared by dissolving 0.4 mol of monomer A-1 and 1.0 mol of acrylic acid (molar ratio: 40/100) in 8 mol of water, a 20% aqueous solution prepared by dissolving 0.002 mol of ammonium persulfate in water, and 0.6 g of 2-mercaptoethanol were dropwise added to the water in the reactor simultaneously and separately in 2 hours. Then, a 20% aqueous solution prepared by dissolving 0.006 mo' of ammonium persulfate in water was dropwise added to the reaction system in 30 minutes. After the completion of the dropwise addition, the reaction system was maintained at that temperature (75° C.) for one hour. That is, aging was effected. After the completion of the aging, the temperature of the reaction system was raised to 95° C. Then, 3 g of a 35% aqueous hydrogen peroxide was dropwise added to the reaction system in one hour. After the completion of the dropwise addition, the reaction system was maintained at that temperature (95° C.) for 2 hours. That is, aging was effected. After the completion of the aging, a 48% aqueous solution prepared by dissolving 0.14 mol of sodium hydroxide in water was added to the obtained reaction mixture to conduct neutralization. Thus, a copolymer having a molecular weight of 35,000, i.e., dispersant 8 for plaster, was obtained.

Preparative Example 9 (preparation of dispersant 9 for plaster)

5 mol of water was fed into a reactor fitted with a stirrer. Air in the reactor was purged with nitrogen while stirring the water. The temperature of the water was raised to 75° C. in a nitrogen atmosphere. A solution prepared by dissolving 1.0 mol of monomer A-1 and 1.0 mol of acrylic acid (molar ratio: 100/100) in 8 mol of water, a 20% aqueous solution prepared by dissolving 0.001 mol of ammonium persulfate in water, and 0.3 g of 2-mercaptoethanol were dropwise added to the water in the reactor simultaneously and separately in 2 hours. Then, a 20% aqueous solution prepared by dissolving 0.003 mol of ammonium persulfate in water was dropwise added to the reaction system in 30 minutes. After the completion of the dropwise addition, the reaction system was maintained at that temperature (75° C.) for one hour. That is, aging was effected. After the completion of the aging, the temperature of the reaction system was raised to 95° C. Then, 2 g of a 35% aqueous hydrogen peroxide was dropwise added to the reaction system in one hour. After the completion of the dropwise addition, the reaction system was maintained at that temperature (95° C.) for 2 hours. That is, aging was effected. After the completion of the aging, a 48% aqueous solution prepared by dissolving 0.07 mol of sodium hydroxide in water was added to the obtained reaction mixture to conduct neutralization. Thus, a copolymer having a molecular weight of 32,000, i.e., dispersant 9 for plaster, was obtained.

Preparative Example 10 (preparation of dispersant 10 for plaster)

5 mol of water was fed into a reactor fitted with a stirrer. Air in the reactor was purged with nitrogen while stirring the water. The temperature of the water was raised to 75° C. in a nitrogen atmosphere. A solution prepared by dissolving 0.5 mol of monomer A-1 and 1.0 mol of acrylic acid (molar ratio: 50/100) in 13 mol of water, a 20% aqueous solution prepared by dissolving 0.001 mol of ammonium persulfate in water, and 0.3 g of 2-mercaptoethanol were dropwise added to the water in the reactor simultaneously and separately in 2 hours. Then, a 20% solution prepared by dissolving 0.003 mol of ammonium persulfate in water was dropwise added to the reaction system in 30 minutes. After the completion of the dropwise addition, the reaction system was maintained at that temperature (75° C.) for one hour. That is, aging was effected. After the completion of the aging, the temperature of the reaction system was raised to 95° C. Then, 2 g of a 35% aqueous hydrogen peroxide was dropwise added to the reaction system in one hour. After the completion of the dropwise addition, the reaction system was maintained at that temperature (95° C.) for 2 hours. That is, aging was effected. After the completion of the aging, a 48% aqueous solution prepared by dissolving 0.07 mol of sodium hydroxide in water was added to the obtained reaction mixture to conduct neutralization. Thus, a copolymer having a molecular weight of 31,000, i.e., dispersant 10 for plaster, was obtained.

Preparative Example 11 (preparation of dispersant 11 for plaster)

10 mol of water was fed into a reactor fitted with a stirrer. Air in the reactor was purged with nitrogen while stirring the water. The temperature of the water was raised to 75° C. in a nitrogen atmosphere. A solution prepared by dissolving 0.1 mol of monomer A-7 and 1 mol of acrylic acid (molar ratio: 10/100) in 7.5 mol of water, a 20% aqueous solution prepared by dissolving 0.01 mol of ammonium persulfate in water, and 4 g of 2-mercaptoethanol were dropwise added to the water in the reactor simultaneously and separately in 2 hours. Then, a 20% aqueous solution prepared by dissolving 0.03 mol of ammonium persulfate in water was dropwise added to the reaction system in 30 minutes. After the completion of the dropwise addition, the reaction system was maintained at that temperature (75° C.) for one hour. That is, aging was effected. After the completion of the aging, the temperature of the reaction system was raised to 95° C. Then, 12 g of a 35% aqueous hydrogen peroxide was dropwise added to the reaction system in one hour. After the completion of the dropwise addition, the reaction system was maintained at that temperature (95° C.) for 2 hours. That is, aging was effected. After the completion of the aging, a 48% aqueous solution prepared by dissolving 0.7 mol of sodium hydroxide in water was added to the obtained reaction mixture to conduct neutralization. Thus, a copolymer having a molecular weight of 11,000, i.e., dispersant 11 for plaster, was obtained.

Preparative Example 12 (preparation of dispersant 12 for plaster)

8 mol of water was fed into a reactor fitted with a stirrer. Air in the reactor was purged with nitrogen while stirring the water. The temperature of the water was raised to 75° C. in a nitrogen atmosphere. A solution prepared by dissolving 0.05 mol of monomer A-8 and 1 mol of acrylic acid (molar ratio: 5/100) in 10 mol of water, a 20% aqueous solution prepared by dissolving 0.01 mol of ammonium persulfate in water, and 3 g of 2-mercaptoethanol were dropwise added to the water in the reactor simultaneously and separately in 2 hours. Then, a 20% aqueous solution prepared by dissolving 0.03 mol. of ammonium persulfate in water was dropwise added to the reaction system in 30 minutes. After the completion of the dropwise addition, the reaction system was maintained at that temperature (75° C.) for one hour. That is, aging was effected. After the completion of the aging, the temperature of the reaction system was raised to 95° C. Then, 10 g of a 35% aqueous hydrogen peroxide was dropwise added to the reaction system in one hour. After the completion of the dropwise addition, the reaction system was maintained at that temperature (95° C.) for 2 hours. That is, aging was effected. After the completion of the aging, a 48% aqueous solution prepared by dissolving 0.7 mol of sodium hydroxide in water was added to the obtained reaction mixture to conduct neutralization. Thus, a copolymer having a molecular weight of 52,000, i.e., dispersant 12 for plaster, was obtained.

Preparative Example 13 (preparation of dispersant 13 for plaster)

5 mol of water was fed into a reactor fitted with a stirrer. Air in the reactor was purged with nitrogen while stirring the water. The temperature of the water was raised to 95° C. in a nitrogen atmosphere. A solution prepared by dissolving 0.005 mol of monomer A-9 and 1 mol of acrylic acid (molar ratio: 0.5/100) in 15 mol of warm water at 75° C., a 20% aqueous solution prepared by dissolving 0.01 mol of ammonium persulfate in water, and 3 g of 2-mercaptoethanol were drop wise added to the water in the reactor simultaneously and separately in 2 hours. Then, a 20% aqueous solution prepared by dissolving 0.03 mol of ammonium persulfate in water was dropwise added to the reaction system in 30 minutes. After the completion of the dropwise addition, the reaction system was maintained at that temperature (95° C.) for one hour. That is, aging was effected. After the completion of the aging, 9 g of a 35% aqueous hydrogen peroxide was dropwise added to the reaction system in one hour. After the completion of the dropwise addition, the reaction system was maintained at that temperature (95° C.) for 2 hours. That is, aging was effected. After the completion of the aging, a 48% aqueous solution prepared by dissolving 0.7 mol of sodium hydroxide in water was added to the obtained reaction mixture to conduct neutralization. Thus, a copolymer having a molecular weight of 25,000, i.e., dispersant 13 for plaster, was obtained.

The following admixtures were also used as comparative ones:

NS: an admixture comprising salt of naphthalenesulfonic acid-formaldehyde condensate (Mighty 150, a product of Kao Corporation), and PS: an admixture comprising salt of naphthalene sulfonic acidformaldehyde condensate (Sunfrode S, a product of Nippon Seischi Corporation)

PC: sodium polyacrylate (Poise 530, a product of Kao Corporation)

Evaluation of Dispersants for Plaster

The following compound was used for making foam Emal D-3-D (a product of Kao Corporation)

The tests were conducted under the following conditions. Materials shown below were introduced into a small PIN-mixer, the fluidity of the slurry and the stability of foam after mixing for 15 minutes were measured.

| Materials | |
|---|---|
| plaster powder | 1000 g |
| water | 600 g |
| dispersant | 0.1 wt. % by solid of plaster |
| foam | 400 ml. (0.05 g/ml, volume up to 20 times) is made by a foam maker with 1% aqueous solution of Emal D-3-D |

Method of Measuring Fluidity

The slurry is packed into the cylindrical tube (Φ 50 mm×50 mm high), the cyclindrical tube is removed and the diameter of the slurry is then calculated.

Method of Measuring Stability of Foam

It is calculated the weight of plaster slurry per the same volume, then it is calculated with the below formula considering weight ratio of each material.

$$\text{The Stability of foam} = \frac{\dfrac{\text{The Weight of Plaster}}{\text{The Volume of Plaster}} \quad \dfrac{\text{Weight of Water}}{\text{Volume of Water}} \quad \dfrac{\text{Weight of foam}}{\text{Volume of foam}}}{\dfrac{\text{Weight of Surry}}{\text{Volume of Surry}}}$$

The dispersant for plaster of the present invention has excellent foam stability performance in the plaster boards. With prior art plaster boards, undesirable large spaces or voids are incorporated therein which results in a weaker board when outside forces are exerted against it.

On the other hand the dispersant of the present invention results in a plaster board which is low in weight, has a high flexibility, and absorbs noise well.

The results are given in Table 1.

| | Type of dispersant | Stability of foam | Fluidity |
|---|---|---|---|
| Invention Product | C-1 | 74.3 | 130 |
| | C-2 | 77.5 | 133 |
| | C-3 | 81.3 | 133 |
| | C-4 | 85.0 | 139 |
| | C-5 | 83.4 | 134 |
| | C-6 | 84.6 | 137 |
| | C-7 | 73.5 | 128 |

-continued

|  | Type of dispersant | Stability of foam | Fluidity |
|---|---|---|---|
|  | C-8 | 70.3 | 125 |
|  | C-9 | 70.5 | 124 |
|  | C-10 | 70.2 | 123 |
|  | C-11 | 82.7 | 136 |
|  | C-12 | 81.2 | 133 |
| Comp. product | C-13 | 51.3 | 119 |
|  | NS | 43.2 | 115 |
|  | PS | 42.7 | 107 |
|  | PC | 49.8 | 103 |

As is clarified from the results given in Table 1, the dispersant of the present invention imparts fluidity to a plaster composition. Further, the plaster composition containing the dispersant of the present invention improves the stability of the foam.

Having thus described the invention in detail and with reference to specific embodiments thereof, it will be apparent to one skilled in the art that various changes and modifications can be made therein without departing from the spirit and scope thereof.

What is claimed:

1. A method for improving the foam-stability of a plaster composition which comprises adding a copolymer prepared by copolymerizing a monomer (a) represented by the following formula (A) with a monomer (b) selected from the group consisting of the compounds represented by the following formula (B) and those represented by the following formula (C) to a plaster composition:

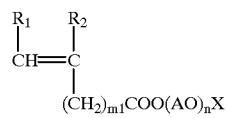

(A)

wherein $R_1$ and $R_2$ may be the same or different from each other and each represents a hydrogen atom or a methyl group; ml is an integer of 0 to 300; AO represents an oxyalkylene group having 2 to 3 carbon atoms; n is a number of 2 to 300; and X represents a hydrogen atom or an alkyl group having 1 to 3 carbon atoms,

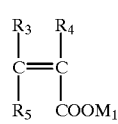

(B)

wherein $R_3$, $R_4$ and $R_5$ may be the same or different from one another and each represents a hydrogen atom, a methyl group or a group represented by the formula: $(CH_2)_{m2}COOM_2$ (wherein m2 is an integer of 0 to 2; and M2 represents a hydrogen atom, an alkali metal atom, ½ an alkaline earth metal atom, an ammonium group, an alkylammonium group or a substituted alkylammonium group); and M1 represents a hydrogen atom, an alkali metal atom, ½ an alkaline earth metal atom, an ammonium group, an alkylammonium group or a substituted alkylammonium group, and

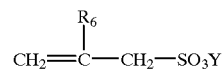

(C)

wherein $R_6$ represents a hydrogen atom or a methyl group; and Y represents a hydrogen atom, an alkali metal atom, ½ an alkaline earth metal atom, an ammonium group, an alkylammonium group or a substituted alkylammonium group.

2. A plaster composition comprising a copolymer prepared by copolymerizing a monomer (a) represented by the following formula (A) with a monomer (b) selected from the group consisting of the compounds represented by the following formula (B) and those represented by the following formula (C), plaster and water:

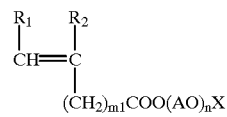

(A)

wherein $R_1$ and $R_2$ may be the same or different from each other and each represents a hydrogen atom or a methyl group; ml is an integer of 0 to 300; AO represents an oxyalkylene group having 2 to 3 carbon atoms; n is a number of 2 to 300; and X represents a hydrogen atom or an alkyl group having 1 to 3 carbon atoms,

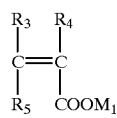

(B)

wherein $R_3$, $R_4$ and $R_5$ may be the same or different from one another and each represents a hydrogen atom, a methyl group or a group represented by the formula: $(CH_2)_{m2}COOM_2$ (wherein $m_2$ is an integer of 0 to 2; and M2 represents a hydrogen atom, an alkali metal atom, ½ an alkaline earth metal atom, an ammonium group, an alkylammonium group or a substituted alkylammonium group); and M1 represents a hydrogen atom, an alkali metal atom, ½ an alkaline earth metal atom, an ammonium group, an alkylammonium group or a substituted alkylammonium group, and

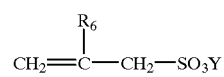

(C)

wherein $R_6$ represents a hydrogen atom or a methyl group; and Y represents a hydrogen atom, an alkali metal atom, ½ an alkaline earth metal atom, an ammonium group, an alkylammonium group or a substituted alkylammonium group.

3. The plaster composition as set forth in claim 2, wherein the copolymer is present in an amount of 0.01 to 1.0% by weight based on the weight of the plaster.

* * * * *

UNITED STATES PATENT AND TRADEMARK OFFICE
CERTIFICATE OF CORRECTION

PATENT NO. : 6,264,739 B1  
APPLICATION NO. : 08/917495  
DATED : July 24, 2001  
INVENTOR(S) : Fujio Yamato et al.

Page 1 of 1

It is certified that error appears in the above-identified patent and that said Letters Patent is hereby corrected as shown below:

Column 13, line 44, "0 to 300" should read -- 0 to 2 --;  
line 46, "2 to 300" should read -- 110 to 300 --.

Column 14, line 28, "0 to 300" should read -- 0 to 2 --;  
line 30, "2 to 300" should read -- 110 to 300 --.

Signed and Sealed this

Fifth Day of May, 2009

JOHN DOLL  
*Acting Director of the United States Patent and Trademark Office*